(12) United States Patent
Miller et al.

(10) Patent No.: US 6,853,902 B2
(45) Date of Patent: Feb. 8, 2005

(54) MOTOR VEHICLE DYNAMIC STABILITY CONTROL

(75) Inventors: Steven Allan Miller, Batley (GB); Robert Alan Williams, Ashby-de-la-Zouch (GB); Philip Alexander Barber, Solihull (GB)

(73) Assignee: Jaguar Cars Limited, Coventry (GB)

( * ) Notice: Subject to any disclaimer, the term of this patent is extended or adjusted under 35 U.S.C. 154(b) by 33 days.

(21) Appl. No.: 10/203,127

(22) PCT Filed: Jan. 30, 2001

(86) PCT No.: PCT/GB01/00359

§ 371 (c)(1),
(2), (4) Date: Oct. 25, 2002

(87) PCT Pub. No.: WO01/56849

PCT Pub. Date: Aug. 9, 2001

(65) Prior Publication Data

US 2003/0116373 A1 Jun. 26, 2003

(30) Foreign Application Priority Data

Feb. 2, 2000 (GB) .............................................. 0002292

(51) Int. Cl.⁷ .............................. B60T 8/00; G05D 1/02
(52) U.S. Cl. ............................. 701/82; 701/41; 701/91; 701/96; 180/167
(58) Field of Search ............................. 701/82, 83, 84, 701/71, 69, 72, 4, 91, 96, 200, 209, 213, 88, 301, 87, 89; 342/70, 71, 72, 357.08, 357.17; 180/167

(56) References Cited

U.S. PATENT DOCUMENTS

| 5,314,037 | A | 5/1994 | Shaw et al. .................. 180/169 |
| 5,315,295 | A | 5/1994 | Fujii ........................... 340/926 |

(List continued on next page.)

FOREIGN PATENT DOCUMENTS

| DE | 197 48 912 A1 | 5/1998 | .......... B60K/31/00 |
| DE | 198 30 318 A1 | 1/1999 | .......... B60K/26/00 |
| DE | 199 26 745 A1 | 12/1999 | ............ G08G/1/16 |
| EP | 0 911 234 A2 | 4/1999 | ............ B60T/8/00 |
| GB | 2 286 905 A | 8/1995 | .......... G01C/21/20 |
| GB | 2 358 506 A | 7/2001 | ......... G08G/1/0967 |

OTHER PUBLICATIONS

Hamberger W. et al., "Navigationssysteme als Datenbasis Fuer Ein Adaptives Antriebsmanagement" ATZ *Automobiltechnische Zeitschrift*, Stuttgart vol. 98, No. 4, pp. 218–222, Apr. 1, 1996.

Donges, E et al. "Regelsysteme zur Fahrzeugfuehrung und Stabilisierung in der Automobiltechnik", *Automatisierungstechnik*, Munchen, vol. 44, No. 5, pp. 226–228, 230–233, May 1, 1996.

*Primary Examiner*—Tan Q. Nguyen
(74) *Attorney, Agent, or Firm*—Davis & Bujold, P.L.L.C.

(57) ABSTRACT

A motor vehicle having a plurality of road engaging wheels (7–10), a braking system (3, 14–18) linked to the wheels (7–10) by which a driver of the vehicle (1) may brake the vehicle, a motive means (50) linked to one or more of the wheels (7–10) by which a driver of the vehicle may control vehicle speed, and a dynamic stability control system that includes a means (12–17, 20–22, 24) for deducing the position and orientation of the vehicle system (12–17, 20–22, 24) for predicting the trajectory ($T_P$) of the motor vehicle (1) with respect to the roadway (4) and for identifying when the predicted trajectory ($T_P$) would place the vehicle in danger, and a wheel slip detection system (14–18, 51) for detecting loss of traction of one or more of the wheels (12–17). The dynamic stability control system monitors wheel slip and the predicted trajectory ($T_P$) of the vehicle (1), and, if loss of wheel traction is detected when the predicted trajectory ($T_P$) would place the vehicle (1) in danger, acts to alter ($T_C$) the predicted trajectory, for example by controlling the braking system (14–18) and/or the motive means (50) in such a way that the identified danger is reduced or eliminated.

9 Claims, 2 Drawing Sheets

U.S. PATENT DOCUMENTS

| | | | |
|---|---|---|---|
| 5,350,912 A | 9/1994 | Ishida | 250/202 |
| 5,359,666 A | 10/1994 | Nakayama et al. | 382/1 |
| 5,467,284 A | 11/1995 | Yoshioka et al. | 364/461 |
| 5,479,173 A | 12/1995 | Yoshioka et al. | 342/70 |
| 5,529,138 A | 6/1996 | Shaw et al. | 180/169 |
| 5,540,298 A | 7/1996 | Yoshioka et al. | 180/169 |
| 5,757,949 A | 5/1998 | Kinoshita et al. | 382/104 |
| 5,928,299 A * | 7/1999 | Sekine et al. | 701/41 |
| 5,978,724 A | 11/1999 | Sekine | 701/70 |
| 6,070,118 A * | 5/2000 | Ohta et al. | 701/65 |
| 6,076,034 A | 6/2000 | Satoh et al. | 701/70 |
| 6,141,619 A | 10/2000 | Sekine | 701/93 |
| 6,157,892 A | 12/2000 | Hada et al. | 701/301 |
| 6,199,001 B1 * | 3/2001 | Ohta et al. | 701/51 |
| 6,208,927 B1 * | 3/2001 | Mine et al. | 701/70 |
| 6,343,253 B1 * | 1/2002 | Matsuura et al. | 701/200 |

* cited by examiner

MOTOR VEHICLE DYNAMIC STABILITY CONTROL

FIELD OF THE INVENTION

The present invention relates to a motor vehicle having dynamic stability control.

BACKGROUND OF THE INVENTION

Driver error is the cause of many motor vehicle accidents. Sometimes, the driver does not anticipate correctly slippery road conditions, or the driver panics and applies the brakes or the accelerator in a manner that causes the wheels to slip, or uncontrollably slide. Once the wheels start to slide, a driver can quickly loose control of the vehicle. As a result, anti-lock braking (ABS) systems and traction control systems have been developed that detect the onset of wheel slip. These systems control braking and wheel torque to reduce wheel slip. However, unless the driver steers correctly, an accident may still happen. In addition, the effectiveness of traction control and ABS systems is reduced if a vehicle's wheels slide owing to poor grip between the wheels and road, for example, due to ice on a sharp corner.

It is an object of the present invention to provide a dynamic stability control system that can help the driver keep the vehicle on the road when one or more of the wheels starts to slip or slide.

According to the invention, there is provided a motor vehicle comprising a plurality of road engaging wheels, and a dynamic stability control system that includes a means for deducing the position and orientation of the vehicle with respect to a roadway on which the vehicle travels, a path prediction system for predicting the trajectory of the motor vehicle with respect to the roadway and for identifying when the predicted trajectory would place the vehicle in danger, and a wheel slip detection system for detecting loss of traction of one or more of the wheels, wherein the dynamic stability control system is arranged to predict the trajectory of the vehicle, determine whether the predicted trajectory would place the vehicle in danger, and, if loss of wheel traction is detected when the predicted trajectory would place the vehicle in danger, to alter the predicted trajectory in such a way that the identified danger is reduced or eliminated.

The dynamic stability control system may alter the trajectory by altering the degree of braking applied to at least one of the wheels of the vehicle by the vehicle braking system, or by altering the level of drive torque applied to at least one of the wheels by whatever motive means the vehicle includes. This may include, for example, a controllable differential which can vary the distribution of drive torque between the two sides of the vehicle. Systems using control of the magnitude and distribution of braking and/or driving torque between the wheels have the advantage that the trajectory of the vehicle can be controlled without the need for expensive and complex active steering or steer by wire systems. However, where the vehicle includes a steer by wire, active steering, or electric power assisted steering system, the vehicle trajectory can be altered using the steering system. In any event, because the system only starts to alter the vehicle's trajectory when loss of traction is detected, for most of the time the driver retains direct control over the vehicle's trajectory. In the case of steer by wire, the steering can be controlled so as to follow the steering angle requested by the driver using the steering wheel when loss of traction is not detected. The steering then only becomes truly active during loss of traction.

The motive means may include any type of motor, such as an internal combustion engine or an electric motor.

The dimensions and shape of the roadway, including the width of the roadway, the radius of curves, the location of lanes, hard shoulders, crash barriers and fixed obstacles may all be measured as the vehicle travels on the road. For example, a forward-looking radar or machine vision system may include processing means by which any of the above factors may be determined. The position of a lane in the roadway may be deduced over time from the course the vehicle travels and the measured dimensions and shape of the road. From this, the position and orientation of a vehicle with respect to the roadway may be deduced. In practice, however, it may be difficult to use radar or machine vision to detect and measure unambiguously various features in a continuous manner as the vehicle travels down the roadway, particularly if it is desired to achieve a precision high enough to enable a good estimate of danger in the event of wheel slip. In many cases, the difference between a safe vehicle trajectory and a dangerous vehicle trajectory may be a difference in trajectory of about 1 m or less. Preferably, the predicted vehicle trajectory is accurate to within ±0.1 m of the actual trajectory.

Another approach to predicting the vehicle trajectory with respect to a roadway involves a priori knowledge of roadway dimensions and shape combined with means by which the position and orientation of the vehicle can be accurately estimated, for example using internal vehicle movement sensors. For example, road speed can be measured directly from wheel speed sensors as part of a known anti-lock braking system (ABS). The vehicle may also have a number of accelerometers or yaw rate sensors, by which changes in vehicle orientation with respect to a co-ordinate system can be deduced. In general, the shape and characteristics of a roadway can be measured beforehand and stored in the vehicle for future use. For example, such stored data may be generated by a road mapping agency or company, or by the vehicle itself on a previous run over a particular route. In the latter case, numerous vehicles may upload data, for example by radio or cell phone link, to a central repository of such vehicle generated road map data, from which individual vehicles may then similarly download particular road map data.

Therefore, the means for deducing the position and orientation of the vehicle with respect to the roadway may include a memory means that stores road layout data for a geographical area in which the vehicle travels.

SUMMARY OF THE INVENTION

In a preferred embodiment of the invention, the dynamic stability control system is responsive also to the selected steering angle so that when the dynamic stability control system acts to alter the predicted trajectory, the trajectory is altered towards the selected steering angle when this corresponds with a trajectory of reduced or eliminated danger. This provides a number of advantages. First, the means for deducing the position and orientation of the vehicle with respect to the roadway may in some cases not be able to characterize the road completely. If the road layout is stored in a memory, then the layout may have changed since the layout was stored, or the resolution may be limited in some way. Forward-looking radar or vision systems also have limitations, in that certain obstacles or hazards on the roadway may be undetected or misinterpreted. The system, therefore, takes advantage of the driver's perception of such dangers and allows the driver still to influence the trajectory of the vehicle as the dynamic stability control system alters the trajectory to reduce or eliminate the detected danger.

The memory means may include a high capacity solid state memory, or random access storage medium such as a CD ROM disc or a magnetic hard disc. The roadway may be characterized by data including information about any parameter applicable to a roadway, for example: the road's width; the number of lanes and direction of traffic in these lanes; the width of the lanes; the type and location of crash barriers; the width and type of hard shoulder; and the presence of fixed obstacles or other hazards, such as lamp poles and bridge abutments. Although in principle a memory means may store data that characterizes a roadway with any desired degree of resolution, a huge amount of data would be needed to characterize all roadways throughout a geographical area such as an American state or a European country, to the point where a meaningful assessment of danger could be made in the event that wheels begin to slip.

Furthermore, it may be difficult to locate the position of a vehicle accurately using only inertial sensors, particularly when it has been traveling for an extended time in a straight line, for example on a motorway.

Therefore, it is particularly advantageous if the means for deducing position and orientation of the vehicle with respect to the roadway includes in addition to a priori knowledge of the roadway within a certain geographical area, also a means for determining externally of the vehicle the position of the vehicle. The position of the vehicle may be determined either in absolute terms, for example as a pair of Cartesian co-ordinates, or in relative terms, for example with respect to remotely sensed and identified roadway features, such as the location of the edge of the road, or the location of a central reservation crash barrier.

In one embodiment of the invention, the means for deducing position and orientation of the vehicle with respect to the roadway includes a receiver for receiving a remotely transmitted location identification signal within the area, and means for using both the road layout data and location identification signal to deduce at least the position of the vehicle with respect to the roadway. An example of such a location identification signal is a global positioning signal (GPS).

The means for deducing position and orientation of the vehicle with respect to the roadway may include an optical vision system that captures optically a view of the roadway.

Also according to the invention, there is provided a method of dynamically controlling the trajectory of a motor vehicle that includes a dynamic stability control system, and a plurality of road engaging wheels, wherein the method comprises the steps of using the dynamic stability control system to:
  a) deduce the position and orientation of the vehicle with respect to a roadway on which the vehicle travels;
  b) predict the trajectory of the motor vehicle with respect to the roadway and identify when the predicted trajectory would place the vehicle in danger;
  c) detect loss of traction of one or more of the wheels; and
  d) if loss of wheel traction is detected when the predicted trajectory would place the vehicle in danger, alter the predicted trajectory in such a way that the identified danger is reduced or eliminated.

BRIEF DESCRIPTION OF THE DRAWINGS

The invention will now be described by way of example in further detail and with reference to the accompanying drawings, in which.

DETAILED DESCRIPTION OF THE INVENTION

Figure 1:
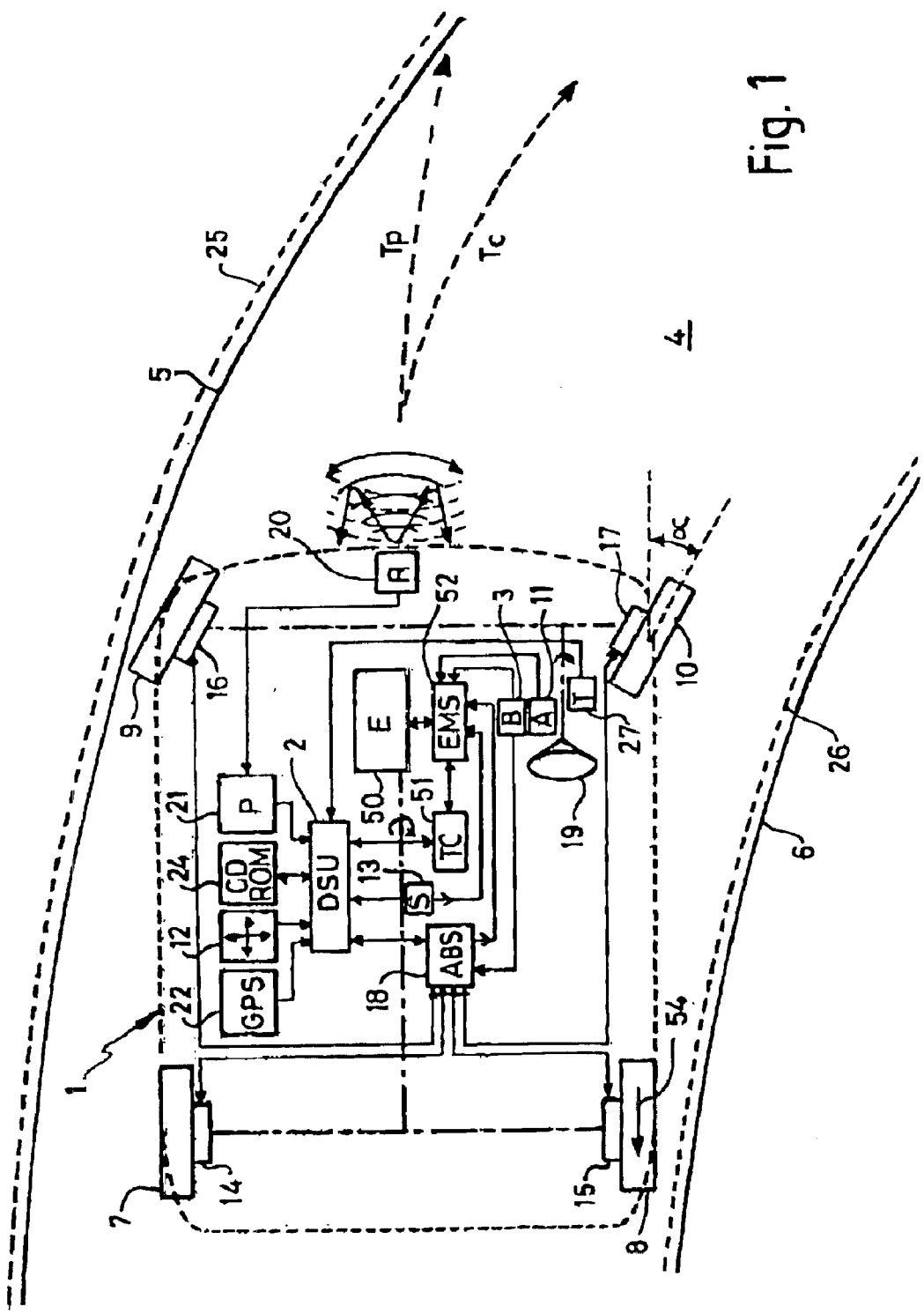
FIG. 1 is a block schematic view of a motor vehicle with dynamic stability control system according to a preferred embodiment of the invention.

FIG. 1 shows schematically a motor vehicle 1, for example a motor car, having a dynamic stability control system based on a dynamic stability unit (DSU) 2. The vehicle 1 is moving on a road 4 having a right-hand curve. The boundaries of the road 4 are shown by two solid curving lines 5, 6 which may be the edge of the road 4 or a lane boundary. As drawn, the vehicle 1 has all four wheels 7, 8, 9, 10 on the road 4 but the vehicle 1 is under-steering, for example due to slippage of the front wheels 9, 10, so that the left front wheel 9 is at risk of straying outside the left-hand road boundary 5.

The vehicle has a conventional arrangement of driver controls, in particular a brake pedal 3, accelerator pedal 11 and steering wheel 19. The brake pedal 3 is linked to an anti-lock braking system control module 18, and the accelerator pedal 11 provides a driver demand signal to an engine management system 52 that controls engine power of an internal combustion engine (E) 50.

Figure 2:
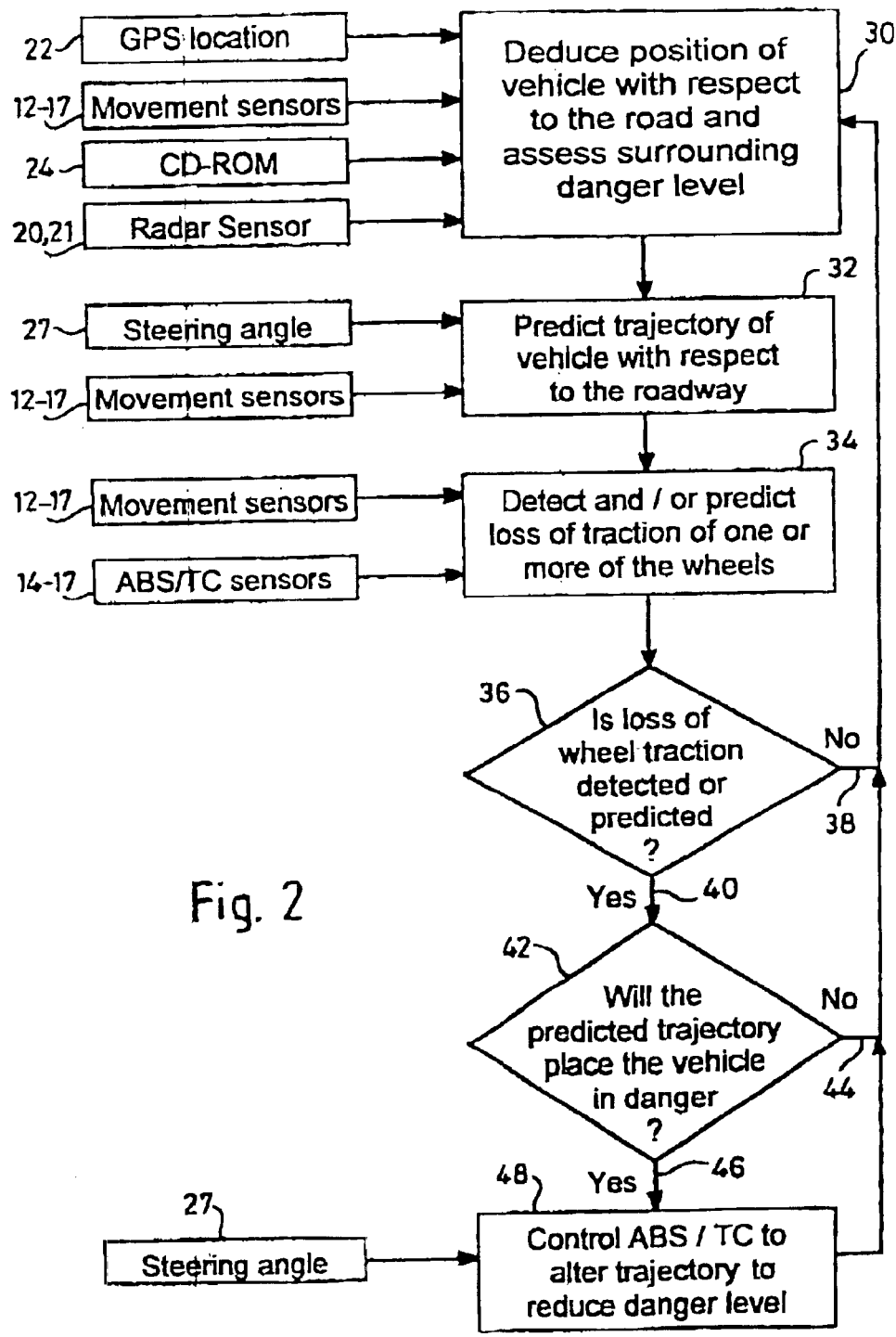
FIG. 2 is a flow diagram showing the operation of the dynamic stability control system of FIG. 1.

With reference now also to FIG. 2, as a first step 30 the dynamic stability unit 2 deduces the position and orientation of the vehicle 1 with respect to the road 4, and then assesses the surrounding danger level. To do this, the unit 2 receives a number of inputs from movement sensors, specifically longitudinal and lateral accelerometers and yaw rate sensors 12, a propeller shaft speed sensor (S) 13, and, via the anti-lock braking system (ABS) control module 18, four wheel speed sensors, one on each wheel 7–10 as part of four disc brake units 14, 15, 16, 17. The various movement sensors 12–17 together provide an accurate measure of the vehicle's velocity and attitude. The ABS control module 18 provides to the dynamic stability unit 2 an indication of detected wheel slip for each of the wheels 7, 8, 9, 10.

The vehicle 1 also has a forwards looking radar transceiver module (R) 20 together with an associated radar signal processing unit (P) 21, and a global positioning system (GPS) receiver 22, which also provide input signals to the dynamic stability unit 2. Optionally, a machine vision system (not shown) may be used in place of the radar system 20, 21. The GPS receiver signal provides a measure of the vehicle's position on the surface of the earth accurate to about ±10 m. This is used by the dynamic stability unit 2 to interrogate a CD-ROM reader unit 24 which is loaded with a CD-ROM disc having information regarding the road 4, such as its orientation, the width, number of lanes, presence or a hard shoulder and any obstacles such as crash barriers, embankments or bridge abutments. The accuracy of the GPS signal is deliberately degraded for national security reasons, and is not normally accurate enough to allow the dynamic stability unit 2 to obtain information from the CD-ROM unit 24 that would allow the dynamic stability unit to predict unambiguously the edge positions 5, 6 of the road 4, or a predicted trajectory $T_P$ of the vehicle 1 with respect to the road 4. In addition, overhanging trees or tall buildings near the road can adversely affect GPS signals. In any event, road information data stored on the CD-ROM disc may not have resolution as good as ±0.5 m for every road in a country or state, and will not have information about any recent or temporary obstruction or obstacle on a road.

Therefore, the dynamic stability unit 2 uses signals received from the radar module and unit 20, 21 to refine the position information received from the GPS signal, and also to fill in details on road layout or hazards not known from the CD-ROM. For example, if a bridge abutment is known from the CD-ROM to be at a co-ordinate (x, y) along the road 4, then as the vehicle approaches the abutment, the GPS derived co-ordinate (X, Y) at that bridge abutment can be corrected to match the CD-ROM co-ordinate using the radar derived information. The various movement sensors 12–17 are then sufficiently accurate to keep track of the vehicle's position and orientation with respect to the road for the next several minutes without the need to make a further correspondence between the GPS, radar and CD-ROM co-ordinates.

Once the dynamic stability unit 2 has deduced the position and orientation of the vehicle 1 with respect to the road, it assigns danger levels to various coordinate points along the road particularly towards and beyond the road edges 5, 6. The danger levels are calculated to include any expected mismatch between road features such as the true edge of road 5, 6, and calculated edge of road 25, 26, so that that danger is assessed conservatively.

Once the vehicle's position and orientation with respect to the road 4 are known, the next step 32 is to predict the trajectory $T_P$ of the vehicle 1 with respect to the road 4. Because steering angle α will affect the future movement of the vehicle 1, a steering angle sensor (T) 27 provides an input signal to the dynamic stability unit 2. This together with the calculated position, orientation, velocity and yaw rate of the vehicle permits the dynamic stability unit 2 to calculate the predicted trajectory $T_P$ of the vehicle with respect to the road 4. Here, the predicted trajectory $T_P$ will take the vehicle 1 off the left-hand edge 5 of the road, and so the trajectory is identified as one that would place the vehicle in danger.

Of course, it may be that the driver is intentionally driving the vehicle off the road in a controlled manner, for example to park on a grass verge. In this case, none of the wheels 7–10 should be slipping. The next step 34 in the flowchart of FIG. 2 is, therefore, to detect the loss of traction of one or more of the wheels 7–10. A test 36 is performed, and if no wheel slip is detected 38, the process cycles back to the first step 30. If, however, wheel slip is detected 40, for example due to ice on the road, or the driver braking excessively on a wet road, then the vehicle front wheels may slip causing the vehicle to under-steer as drawn. Another test 42 is then performed to test whether the predicted trajectory $T_P$ will place the vehicle in danger. If not 44, then the process cycles back to the first step 30.

In the example of FIG. 1, the predicted trajectory $T_P$ will place the vehicle 1 in danger 46, and so the next step 48 is for the dynamic stability unit 2 to control the braking via the ABS control unit 18 and additionally or alternatively engine power via a traction control unit 51 linked to the engine management system (EMS) 52, in order to alter the vehicle's trajectory towards a new calculated trajectory $T_C$ having a reduced or eliminated danger.

In the illustrated example, the front wheels 9, 10 are steering towards the reduced danger calculated trajectory $T_C$, giving a good indication that the driver also perceives this to be of reduced danger. The dynamic stability unit 2, therefore, takes into account the steering angle a as supplied by the steering angle sensor 27 in generating the calculated trajectory $T_C$.

In the illustrated case of under-steer, the dynamic stability unit 2 would via the ABS unit 18 apply the right rear brake 15 to cause the right rear wheel 8 to exert a rearward directed force 54 at that wheel to impart a clockwise yaw to the vehicle so that it may follow the calculated trajectory $T_C$.

The vehicle 1 may not, of course follow the calculated trajectory $T_C$ exactly, and so the flowchart loops back to the first step 30, so that the vehicle position and orientation with respect to the road 4 can be recalculated. The process continues until wheel slip is no longer detected.

The invention can, therefore, help a driver to maintain control of his vehicle in extreme circumstances, and yet does not interfere with the driver's primary means of controlling the vehicle's trajectory using the steering wheel. Once wheel slip is detected, the driver may be losing control the vehicle. Only then does the dynamic stability control system become operational to direct the vehicle to a safer trajectory. Data from inertial vehicle movement sensors can be combined with other data to obtain an accurate measure of a vehicle's position with respect to the roadway. Examples of sources of such other data include: wireless connection to an internet-based database of road map data; an in-car memory such as a CD-ROM system storing details of the road; remote location identification signals; and a radar or machine vision derived measure of the road and its surrounds to provide. It is, therefore, possible to obtain an accurate basis for determining the vehicle's position and orientation with respect to the road, and the likelihood that the vehicle's trajectory will place the vehicle in danger. Action can then be taken by the dynamic stability unit 2 to control wheel braking and/or engine power applied to the driver wheels in order to alter the vehicle trajectory to a safer course.

What is claimed is:

1. A motor vehicle comprising a plurality of road engaging wheels and a dynamic stability control system that includes a means for deducing the position and orientation of the vehicle with respect to a roadway on which the vehicle travels, comprising:

a path prediction system for predicting the trajectory of the motor vehicle with respect to the roadway and for identifying when the predicted trajectory would place the vehicle in danger, and a wheel slip detection system for detecting loss of traction of one or more of the wheels, wherein the dynamic stability control system is arranged to
      predict the trajectory of the vehicle,
      determine whether the predicted trajectory would place the vehicle in danger and, if loss of wheel traction is detected when the predicted trajectory would place the vehicle in danger, and
      alter the predicted trajectory in such a way that the identified danger is reduced or eliminated, wherein the vehicle further includes
      a steering system by which the driver may select a steering angle, wherein
      the dynamic stability control system is responsive also to the selected steering angle so that when the dynamic stability control system acts to alter the predicted trajectory, the trajectory is altered towards the selected steering angle when this corresponds with a trajectory of reduced or eliminated danger.

2. The motor vehicle according to claim 1 further comprising a braking system linked to the wheels by which a driver of the vehicle may brake the vehicle, wherein the dynamic stability control system is arranged to alter the predicted trajectory by altering the degree of braking applied to at least one of the wheels.

3. The motor vehicle according to claim 1 further comprising motive means linked to the wheels by which a driver of the vehicle may control the vehicle speed, wherein the dynamic stability control system is arranged to alter the predicted trajectory by altering the level of driving torque applied to at least one of the wheels by the motive means.

4. The motor vehicle according to claim 1 wherein the dynamic stability control system is arranged to alter the predicted trajectory by altering the steering angle of the vehicle provided by the steering system.

5. The motor vehicle according to claim 1, in which the means for deducing the position and orientation of the vehicle with respect to the roadway includes a memory means that stores road layout data for a geographical area in which the vehicle travels.

6. The motor vehicle according to claim 5, in which the means for deducing position and orientation of the vehicle with respect to the roadway includes a receiver for receiving a remotely transmitted location identification signal within the area, and means for using both the road layout data and location identification signal to deduce at least the position of the vehicle with respect to the roadway.

7. The motor vehicle according to claim 6, in which the location identification signal is a global positioning signal.

8. The motor vehicle according to claim 5, in which the means for deducing position and orientation of the vehicle with respect to the roadway includes an optical vision system that captures optically a view of the roadway.

9. The motor vehicle as claimed in claim 5, in which the means for deducing position and orientation of the vehicle with respect to the roadway includes a radar sensor that captures information regarding the roadway.

* * * * *